United States Patent
Lemineur et al.

(10) Patent No.: US 7,152,867 B2
(45) Date of Patent: Dec. 26, 2006

(54) WHEEL SUPPORT DEVICE, SUSPENSION DEVICE AND VEHICLE COMPRISING ONE SUCH SUPPORT DEVICE

(75) Inventors: Vincent Lemineur, Manzat (FR); Loïc Serra, Tallende (FR); Davy Vernier, Clermont-Ferrand (FR)

(73) Assignee: Michelin Recherche et Techique S.A., Granges-Paccot (CH)

( * ) Notice: Subject to any disclaimer, the term of this patent is extended or adjusted under 35 U.S.C. 154(b) by 0 days.

(21) Appl. No.: 11/149,554

(22) Filed: Jun. 10, 2005

(65) Prior Publication Data

US 2005/0280240 A1      Dec. 22, 2005

Related U.S. Application Data

(63) Continuation of application No. PCT/EP03/14066, filed on Dec. 11, 2003.

(30) Foreign Application Priority Data

Dec. 11, 2002   (FR) .................................. 02 15685

(51) Int. Cl.
    *B62D 17/00*   (2006.01)
(52) U.S. Cl. ............... 280/86.751; 280/5.52; 280/5.521; 280/86.757
(58) Field of Classification Search .......... 280/86.751, 280/86.75, 86.757, 5.52, 5.521
    See application file for complete search history.

(56) References Cited

U.S. PATENT DOCUMENTS 2,907,578 A * 10/1959 Taber ...................... 280/5.508
6,688,620 B1 * 2/2004 Serra et al. ........... 280/124.135

FOREIGN PATENT DOCUMENTS

| FR | 2 806 693 | 9/2001 |
| FR | 2 819 752 | 7/2002 |
| WO | WO 01/72572 | 10/2001 |

* cited by examiner

*Primary Examiner*—Eric Culbreth
(74) *Attorney, Agent, or Firm*—Buchanan Ingersoll & Rooney PC

(57) ABSTRACT

A support device connects a wheel to suspension elements of a vehicle, the wheel having a radius R'. The support device includes rods articulated at their lower ends to the suspension elements and at their upper ends to the wheel carrier so as to confer on the wheel a degree of camber freedom relative to the suspension elements. The camber movement takes place around an instantaneous center of rotation. The device is also configured in such manner that Y and Z are respectively the abscissa and ordinate of the instantaneous position of the instantaneous center of rotation in the camber plane, wherein such position, during a camber deflection from 0° to 1°, satisfies the following conditions:

$Y \leq 0.125 * R$ $Z \leq -0.0625 * R$ $Z \leq 0.66225 * Y + 0.02028 * R$.

21 Claims, 10 Drawing Sheets

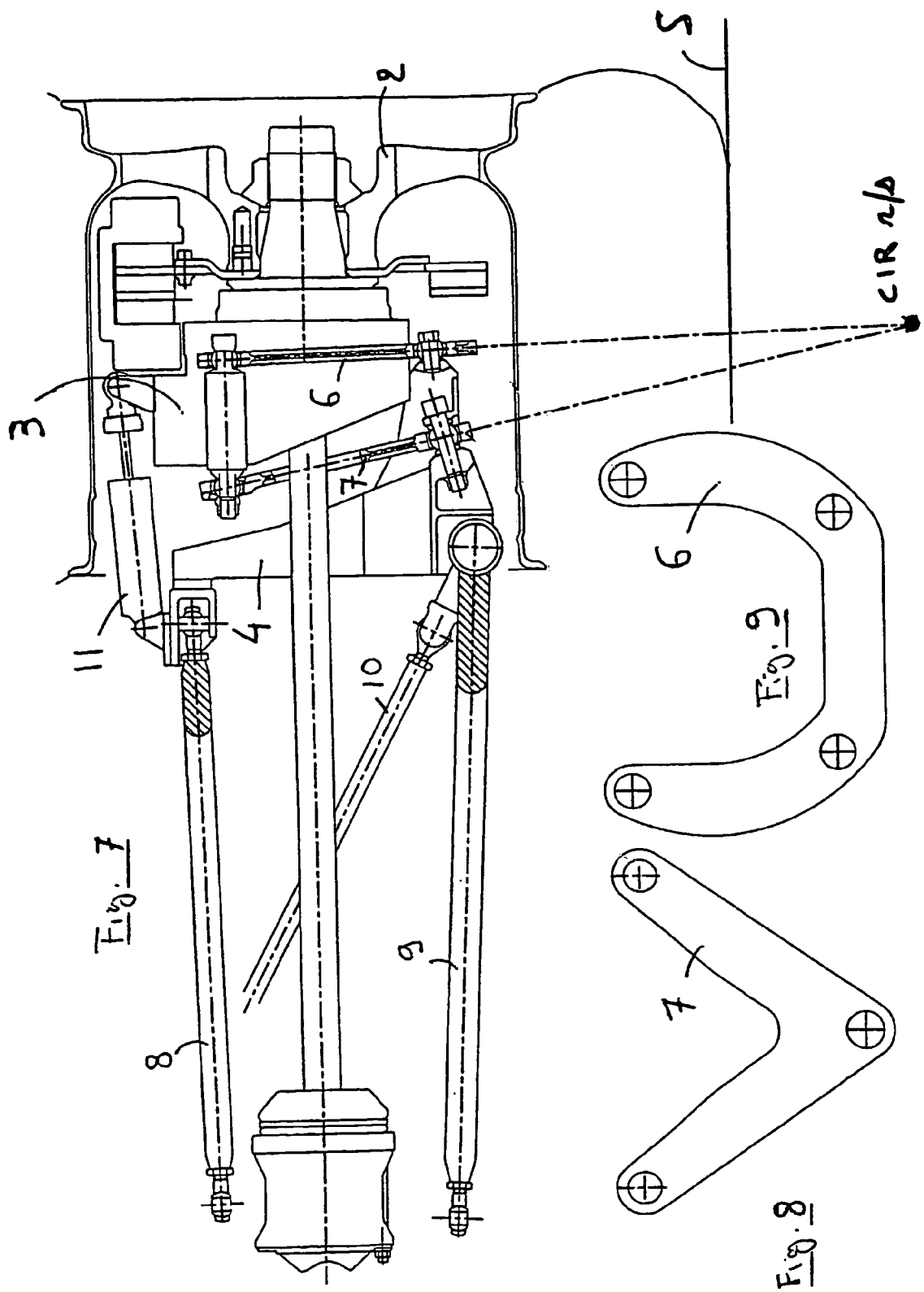

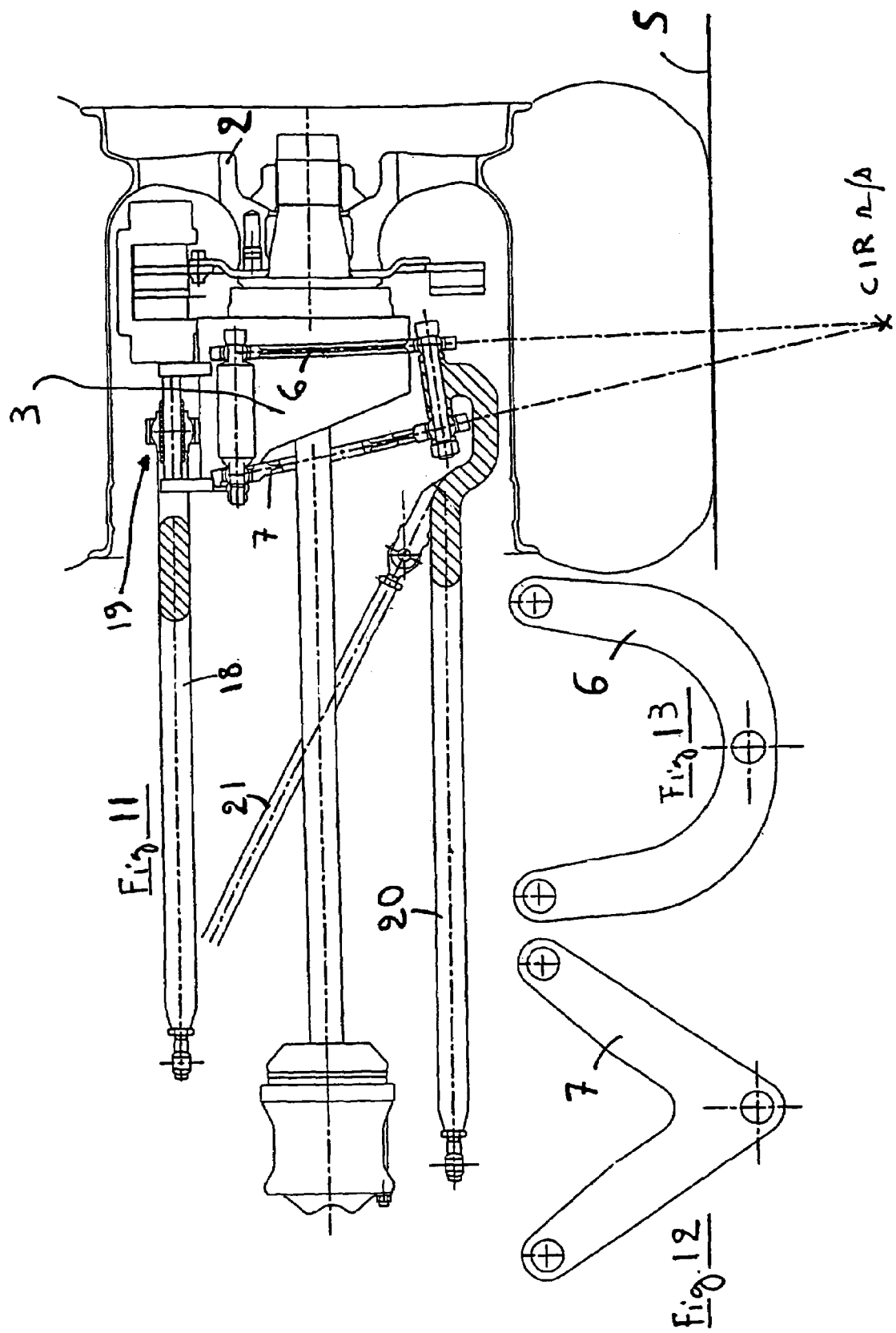

WHEEL SUPPORT DEVICE, SUSPENSION DEVICE AND VEHICLE COMPRISING ONE SUCH SUPPORT DEVICE

The present application is a continuation of International Application PCT/EP2003/014066 filed on Dec. 11, 2003, designating the U.S.

BACKGROUND OF THE INVENTION

The present invention concerns the ground contact system of vehicles, in particular suspension systems and more particularly the guiding of the wheels.

International application WO 01/72572 describes a wheel support device which allows a degree of freedom of the camber of the wheel relative to the suspension elements. This degree of freedom is controlled either actively, for example by a jack as a function of running parameters of the vehicle, or passively by the forces exerted on the wheel.

The "wheel plane" means that plane, related to the wheel, which is perpendicular to the wheel axis and passes through the middle of the tyre. The angular position of the wheel plane relative to the body of the vehicle is defined by two angles, the camber angle and the steering angle. The camber angle of a wheel is the angle which, in a transverse plane perpendicular to the ground, separates the wheel plane from the median plane of the vehicle. This angle is positive when the upper part of the wheel is displaced away from the median plane towards the outside of the vehicle, and in this case one speaks nowadays of "camber" or "positive camber". Conversely, when the said angle is negative, one speaks of "counter-camber" or "negative camber". In what follows, "camber" or "camber angle" will be used interchangeably.

The steering angle of a wheel is that angle which, in a horizontal plane parallel to the ground, separates the wheel plane from the median plane of the vehicle.

The camber plane is the plane in which the camber takes place. It is the vertical plane, transverse relative to the vehicle and passing through the centre of the static contact area When the steering angle of the wheel is zero, the camber plane contains the axis of the wheel.

In application WO 01/72572 it is proposed for passive systems that the instantaneous centre of rotation of the camber movement of the wheel relative to the suspension elements should be located below ground level so that the transverse forces acting on the contact area generate a torque which tends to tilt the wheel plane in the desired direction (this instantaneous centre of rotation is called the "first instantaneous centre of rotation" in the document WO 01/72572). However, although under that condition the transverse forces generate a torque in the camber axis which tends to tilt the wheel in the desired direction, the efficiency in terms of camber variation is very different depending on the implemented configurations. In practice, however, the sensitivity of the camber to forces in the contact area is an important criterion. In effect, it is generally sought to design a wheel support and suspension system such that the passive camber variation is predictable, stable and satisfactory in terms of maximum inclination. This is particularly important for very high-performance vehicles intended especially for racing. For such vehicles the search for absolute performance involves optimisation of the longitudinal and transverse grip. This optimisation is only possible if the camber angle of the wheel is at all times close to the ideal for the functioning of the tyre. A camber that is ideal in terms of tyre grip is one that makes it possible to optimise the homogeneity of the pressure distribution in the contact area, i.e. which for example allows compensation of the effect, on the pressure distribution in the contact area, of lateral deformations of the tyre when it is drifting (typically when cornering).

SUMMARY OF THE INVENTION

Thus, one objective of the invention is a wheel support device such as that described in the document WO 01/72572, whose passive function is improved.

For this, the invention proposes a support device designed to connect a wheel to suspension elements of a vehicle, said wheel of radius 'R' being designed to rest on the ground, said support device comprising rods articulated at their lower ends to the suspension elements and at their upper ends to the wheel carrier, so conferring on said wheel a degree of camber freedom relative to said suspension elements, the camber movement taking place in the camber plane around an instantaneous centre of rotation, said device being characterised in that it is also configured in such manner that, Y and Z being respectively the abscissa and ordinate of the instantaneous position of said instantaneous centre of rotation in the camber plane, said position, during a camber deflection from 0° to −1°, simultaneously satisfies the following conditions:

$Y \leq 0.125*R$ $Z \leq -0.0625*R$ $Z \leq 0.66225*Y + 0.02028*R$

Preferably, the device of the invention is configured such that in addition, during a camber deflection from 0° to −2°, preferably even from 0° to −3° and preferably even from 0° to −4°, the position of the instantaneous centre of rotation also satisfies said conditions.

Still more preferably, the support device of the invention is configured such that the position of said instantaneous centre of rotation, in the case of zero camber, also simultaneously satisfies the following conditions:

$-0.125*R \leq Y \leq 0.125*R$, and more preferably still
$-0.0625*R \leq Y \leq 0.0625*R$ $Z \leq -0.0625*R$ Still more preferably, the support device of the invention is configured such that the position of said instantaneous centre of rotation, for a camber of −1°, also satisfies the following condition:

$Z \leq 0.66225*Y - 0.15*R$

Still more preferably, the support device of the invention is configured such that the position of said instantaneous centre of rotation, for a camber of −2°, also satisfies the following condition:

$Z \leq 0.66225*Y - 0.1625*R$

Still more preferably, the support device of the invention is configured such that the position of said instantaneous centre of rotation, for a camber of −3°, also satisfies the following condition:

$Z \leq 0.66225*Y - 0.1719*R$

Still more preferably, the support device of the invention is configured such that the position of said instantaneous centre of rotation, for a camber of −4°, also satisfies the following condition:

$$Z \leq 0.66225*Y - 0.1844*R$$

Still more preferably, the support device of the invention is configured such that the position of said instantaneous centre of rotation, for a camber of −5°, also satisfies the following condition:

$$Z \leq 0.66225*Y - 0.1969*R$$

The support device of the invention can be configured such that the position of the instantaneous centre of rotation, at zero camber, also satisfies the condition that Z is greater than or equal to −0.9375*R.

In effect, it emerged surprisingly that the displacement of the instantaneous centre of rotation during the camber movement must be contained within limits which are the narrower, the larger is the useful camber range envisaged.

In a variant of the invention, the support device of the invention is designed to be connected to a MacPherson strut.

Preferably, the support device of the invention also comprises control means capable of influencing the camber of the wheel, for example in the form of a damper and/or a spring.

In a preferred embodiment of the invention, the inner rod is connected on the one hand to the wheel carrier by a pivot joint and on the other hand to the suspension elements by a swivel joint.

DESCRIPTION OF THE DRAWINGS

The invention also concerns a suspension system for a vehicle, comprising the support device described above, and a vehicle with such a suspension system.

FIGS. 7, 8 and 9 show an embodiment of a suspension system according to the invention similar to that of FIG. 1.

FIGS. 11, 12 and 13 show an embodiment of a variant of the suspension system of FIG. 10.

DESCRIPTION OF A PREFERRED EMBODIMENT

Figure 1:
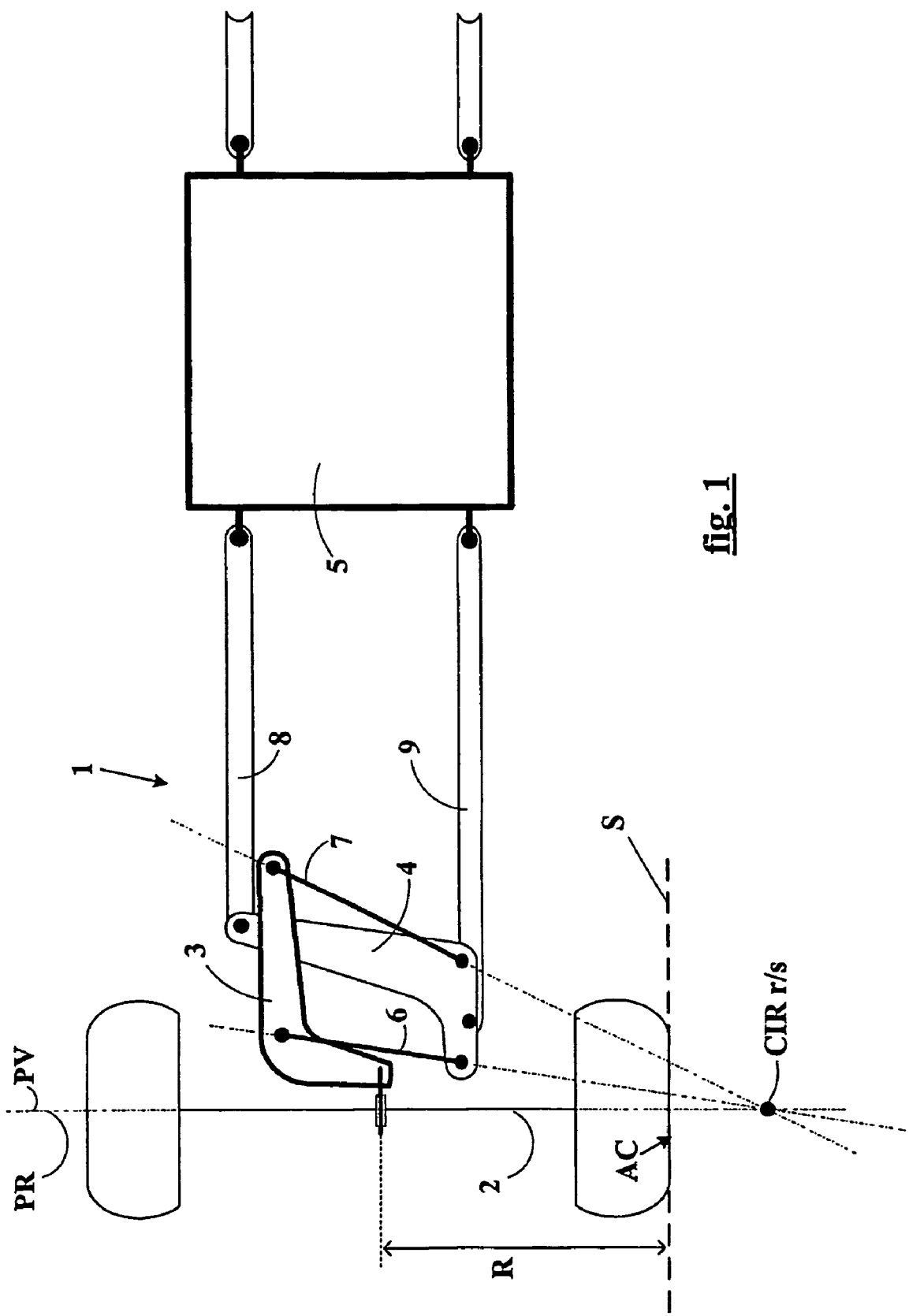
FIG. 1 is a longitudinal plan view showing the principle of a suspension system according to the invention.

The suspension system 1 of the invention is shown in FIG. 1. It comprises various elements designed to maintain the plane PR of a wheel 2 relative to the body 5 of a vehicle. The wheel 2, of radius "R", rests on the ground S via its contact area AC. The radius R (also referred to as the "loaded radius") is the distance between the ground S and the wheel axis when the wheel is vertical and is supporting its rated static working load. The wheel carrier 3 is connected to the body 5 by means (4, 6, 7, 8, 9) which allow it two degrees of freedom. The camber movement of the wheel 2 is allowed by a connection of the wheel carrier 3 to the intermediate support 4 via pivoting rods 6 and 7 articulated with their lower ends to the suspension elements (4, 8, 9) and with their upper ends to the wheel carrier 3. The suspension deflection movement is allowed by a connection of the intermediate support 4 to the body 5 by upper 8 and lower 9 arms (or wishbones). Thus, the suspension system 1 is configured so as to confer on the wheel carrier, relative to the body 5, on the one hand a degree of freedom of suspension deflection since the wheel carrier can undergo essentially vertical movements in a manner known as such, for example in the manner of "multi-arm" or "double wishbone" systems. The suspension spring or other device that supports the load has not been shown here.

The support device comprises the wheel carrier 3 and the camber means (the rods 6 and 7). It is this support device which allows the camber of the wheel to vary relative to the suspension means.

The camber movement of the wheel carrier 3 relative to the intermediate support 4 has an instantaneous centre of rotation (CIR r/s). The position of this instantaneous centre of rotation is determined by the intersection of the axes of the rods 6 and 7 connecting the wheel carrier 3 to the intermediate support 4. FIG. 1 shows the suspension system in a mean position corresponding to the static position of the suspension system when the vehicle is carrying its rated load on flat ground. Here the static camber is represented as essentially zero, i.e. the wheel plane PR corresponds to the vertical plane PV passing through the centre of the contact area AC and parallel to the median plane of the vehicle. The suspension system 1 includes the support device of the invention.

Figure 2:
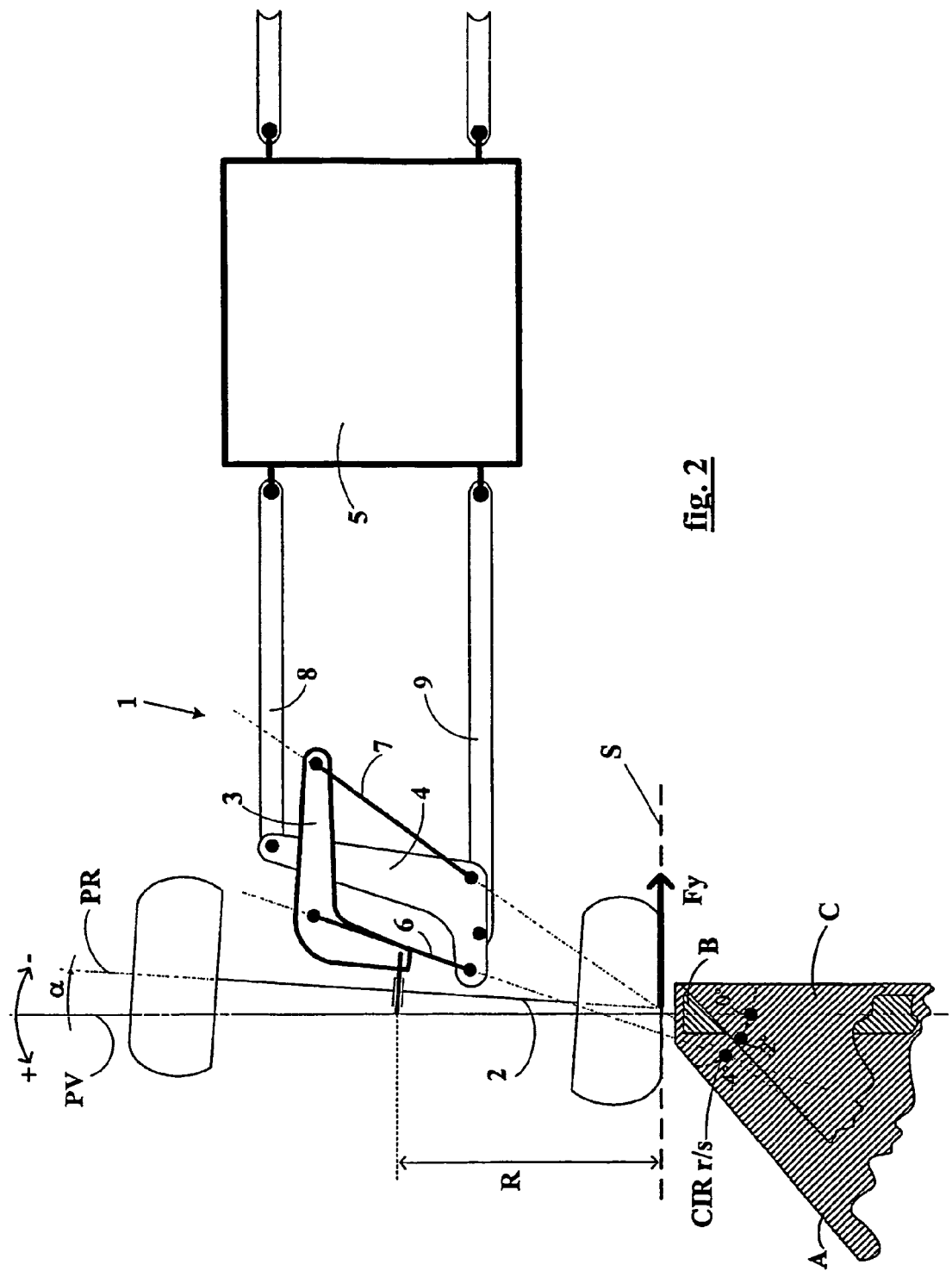
FIG. 2 is a longitudinal plan view showing the principle of a suspension system according to the invention when the wheel camber is varying.

FIG. 2 shows the embodiment of FIG. 1 when the wheel 2 adopts a negative camber angle α (counter-camber). In effect, the wheel plane PR is tilted towards the inside of the vehicle at an angle α relative to the vertical reference plane PV. This inclination can be caused by a transverse force Fy applied within the contact area AC and directed towards the inside of the vehicle. This happens to the wheel on the outside of the bend when the vehicle is moving along a curved path. In contrast, when the wheel is subjected to a force whose transverse component is directed towards the outside of the vehicle (as it is the case for the wheel on the inside of the bend), the component Fy generates a torque which tends to pivot the wheel carrier in the direction of increasing camber (i.e. the camber angle α increases and tends towards positive values).

Camber movements of the wheel carrier can also be "simulated", i.e. imposed by forces applied to the wheel or directly to the wheel carrier while the intermediate support 4 is held fixed relative to the body 5 and to the ground S. This allows the kinematic operation of the system to be checked, measured and analysed.

The instantaneous centre of rotation (CIR r/s) is the point of intersection of the axes of the rods (6, 7) which define the kinematics of the movements of the wheel carrier 3 relative to the intermediate support 4. The position of that point is variable during camber movements of the wheel carrier, as can be seen by comparing FIGS. 1 and 2. A broken line has been used to show the displacement or evolution of the position of the instantaneous centre of rotation (CIR r/s) during the camber deflection. According to an essential feature of the invention, the support device is configured such that the evolution of the instantaneous centre of rotation is contained in a well defined portion of the camber plane. This portion A of the camber plane is delimited by three lines. In fact, the said portion A of the plane is a truncated sector of the camber plane. In the remainder of this description such a portion of the plane will be denoted by the term "sector". A given sector is thus a part of the camber plane within which, according to the invention, the instantaneous centre of rotation is located during a given camber deflection.

The first sector A represents schematically the zone of the camber plane in which, according to the invention, the instantaneous centre of rotation must be located during a camber deflection from 0° to −1°.

If the device is designed to have a useful camber deflection covering at least the range from 0° to −2°, the first sector A is also that part of the camber plane within which the instantaneous centre of rotation should preferably be located during a camber deflection from 0° to −2°.

If the device is designed to have a useful camber deflection covering at least the range from 0° to −3°, the first sector A is also that part of the camber plane within which the instantaneous centre of rotation should preferably be located during a camber deflection from 0° to −3°.

If the device is designed to have a useful camber deflection covering at least the range from 0° to −4°, the first sector A is also that part of the camber plane within which the instantaneous centre of rotation should preferably be located during a camber deflection from 0° to −4°.

FIG. 2 also shows a zone B. The zone B corresponds to the part of the camber plane within which the instantaneous centre of rotation should preferably be located when the camber is zero ($\alpha=0°$). Of course, the zone B is included in the sector A since the position of zero camber is one of the successive positions adopted by the wheel in the c amber deflections envisaged above.

FIG. 2 also shows a second sector C. This sector C corresponds to that part of the camber plane within which the instantaneous centre of rotation should preferably be located for a given counter-camber angle. According to the invention, the larger the useful counter-camber envisaged, the more restrictive is the criterion concerning the corresponding position of the instantaneous centre of rotation. Thus, for a counter-camber of −5° the second sector C falls within the second sector C for a counter-camber of −4, which itself falls within the second sector C for a counter-camber of −3°, and so on, until the second sector C for a counter-camber of −1° which is the widest.

In FIG. 2 the second sector C is for example that corresponding to a counter-camber of −2° ($\alpha=-2°$) and the displacement of the instantaneous centre of rotation represented in the figure corresponds to a camber deflection from 0° to −4° ($\alpha=-4°$). It can be seen that the entire evolution of the instantaneous centre of rotation is contained within the first sector (A), the position corresponding to zero camber ($\alpha=0°$) is contained within zone B, and the position of the instantaneous centre of rotation when the camber is −2° is contained within the second sector (C) shown.

This graphical representation method allows clear visualisation of the significance of the characteristics concerning the evolution of the various positions of the instantaneous centre of rotation. The representation is expressed in the form of conditions relating to the cartesian coordinates (horizontal Y and vertical Z) of the instantaneous centre of rotation in the camber plane.

The various sectors and the zone are open, i.e. they extend to infinity (below ground level). Consequently, the further away the instantaneous centre of rotation of a configuration is located below ground level, the larger can be the evolution that is acceptable according to the preceding criteria. However, secondary criteria such as the track or half-track variation, the bulk or the mass of the system will deter those with knowledge of the field from choosing configurations in which instantaneous centre of rotation is too far below ground level.

Figure 3:
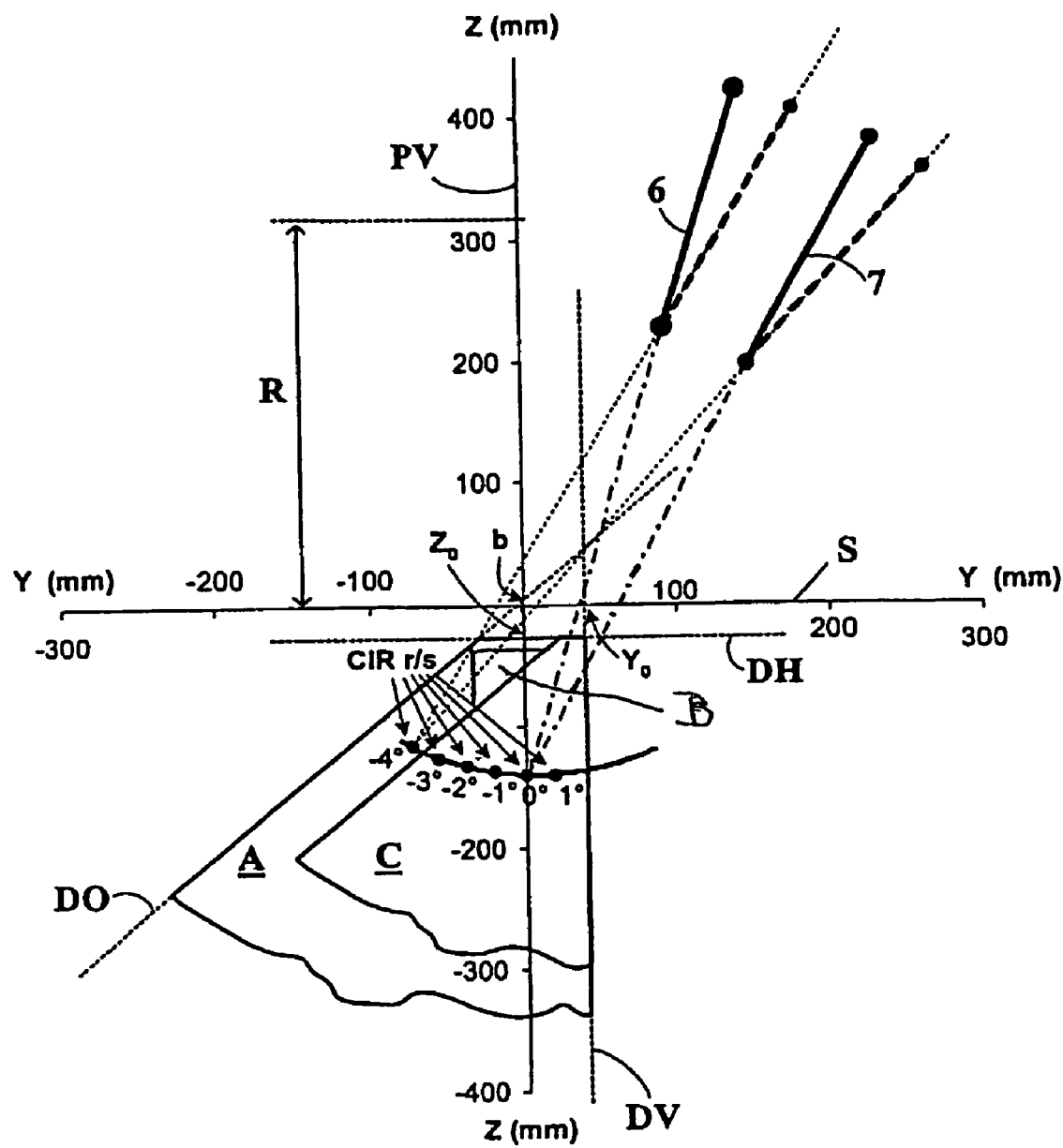
FIGS. 3, 4, 5 and 6 show examples of kinematic configurations of a support device according to the invention.

FIG. 3 represents, in the camber plane, the orthogonal scale (Y—Y, Z—Z) used to characterise the invention. This scale is centred on the one hand upon the vertical plane PV (equivalent to the wheel plane PR when the latter is vertical, see FIG. 1) and on the other hand upon the horizontal plane of the ground S. Thus, the abscissa Y corresponds to the horizontal position relative to the reference plane PV and the ordinate Z corresponds to the vertical position relative to the ground S. The abscissa Y is positive towards the inside of the vehicle and negative towards the outside. The ordinate Z is positive when the point considered is above the ground S and negative when it is below ground level. The axes are graduated in millimetres. In this scale the profiles of the rods 6 and 7 can be marked. The rods are articulated by their lower ends to the suspension elements (not shown) and by their upper ends to the wheel carrier (not shown). As was seen earlier, the movement of the upper part of the rods creates the degree of freedom of the camber of the wheel carrier relative to the suspension elements. The camber movement of the wheel carrier takes place around the instantaneous centre of rotation (CIR r/s) whose position evolves at every moment during the camber movement. Thus, the position of the instantaneous centre of rotation corresponds, throughout the camber movement, to varying coordinates Y and Z. This variation depends on the position and orientation of the rods in the camber plane. The graph (in the same way as FIGS. 1 and 2) can represent a view from behind of the left part of the suspension of a vehicle. The inside of the vehicle will then be on the right of the figure and the outside on the left. FIG. 3 shows the evolution curve of the instantaneous centre of rotation. On this curve are plotted the points corresponding to the position of the instantaneous centre of rotation for camber angles of 1°, 0°, −1°, −2°, −3° and −4°. The positions of the rods 6 and 7 are represented by full lines for 0° camber and by broken lines for −4° camber.

In this representation, sector A is the part of the camber plane delimited by the lines DH, DV and DO. The line DH contains all points where $Z=Z_0$. The line DV contains all points where $Y=Y_0$. The oblique line DO contains all points where $Z=aY+b$, "a" being the slope of DO and "b" being the ordinate at the origin. The sector A can therefore be defined by the following inequalities:

$Y \leq Y_0$ $Z \leq Z_0$ $Z \leq aY+b$

According to the invention, the instantaneous centre of rotation is located along a camber deflection of 0° to −1° and preferably −2°, −3°, −4°. However, if the effective deflection of the device is limited by a stop or structural constraint with the same effect, the basic geometrical configuration of the support device (in particular the position and orientation of the rods) must, according to the invention, still satisfy the conditions expressed by the sector A, i.e. the deflection considered can be in part theoretical or virtual.

Preferably, the device of the invention is configured such that when the camber is zero ($\alpha=0°$), the instantaneous centre of rotation is located in zone B (not shown in this figure for the sake of clarity).

More preferably still, the instantaneous centre of rotation is at a distance smaller than 0.9375*R below ground when the wheel is vertical and carrying its rated static working load. This preferred characteristic can also be expressed in the form of an inequality relating to the ordinate Z when the camber is zero ($\alpha=0°$): $Z \geq -0.9375*R$.

FIG. 3 shows the second sector (C) within which the instantaneous centre of rotation should preferably be located when the camber is for example −4°.

As the criterion expressed by the sector C corresponds to an additional preferred characteristic in relation to the criterion expressed by the sector A, the second sector C is of course included within the first sector A.

Zone B and sector C define zones of the camber plane that correspond to coordinates Y and Z which satisfy conditions different from and additional to those described earlier for sector A.

The example of FIG. 3 concerns a system whose rods 6 and 7 each have an interaxial distance (i.e. a distance in the camber plane between the lower and upper articulation axes) of about 200 mm. It can be seen from the graph that this configuration satisfies the criteria concerning the evolution from 0° to −4° (sector A) and the criteria concerning the position of zero camber (sector B). On the other hand, this particular configuration does not satisfy the criteria (represented by the second sector C) concerning the point position corresponding to a counter-camber of −4° but only for −3°. Of course, since the criteria corresponding to the second sector (C) are the more restrictive, the larger is the counter-camber concerned (see the description of FIG. 2 earlier), the criteria concerning the position of the instantaneous centre of rotation for a counter-camber of −2° and of −1° are in this case also satisfied.

Figure 4:
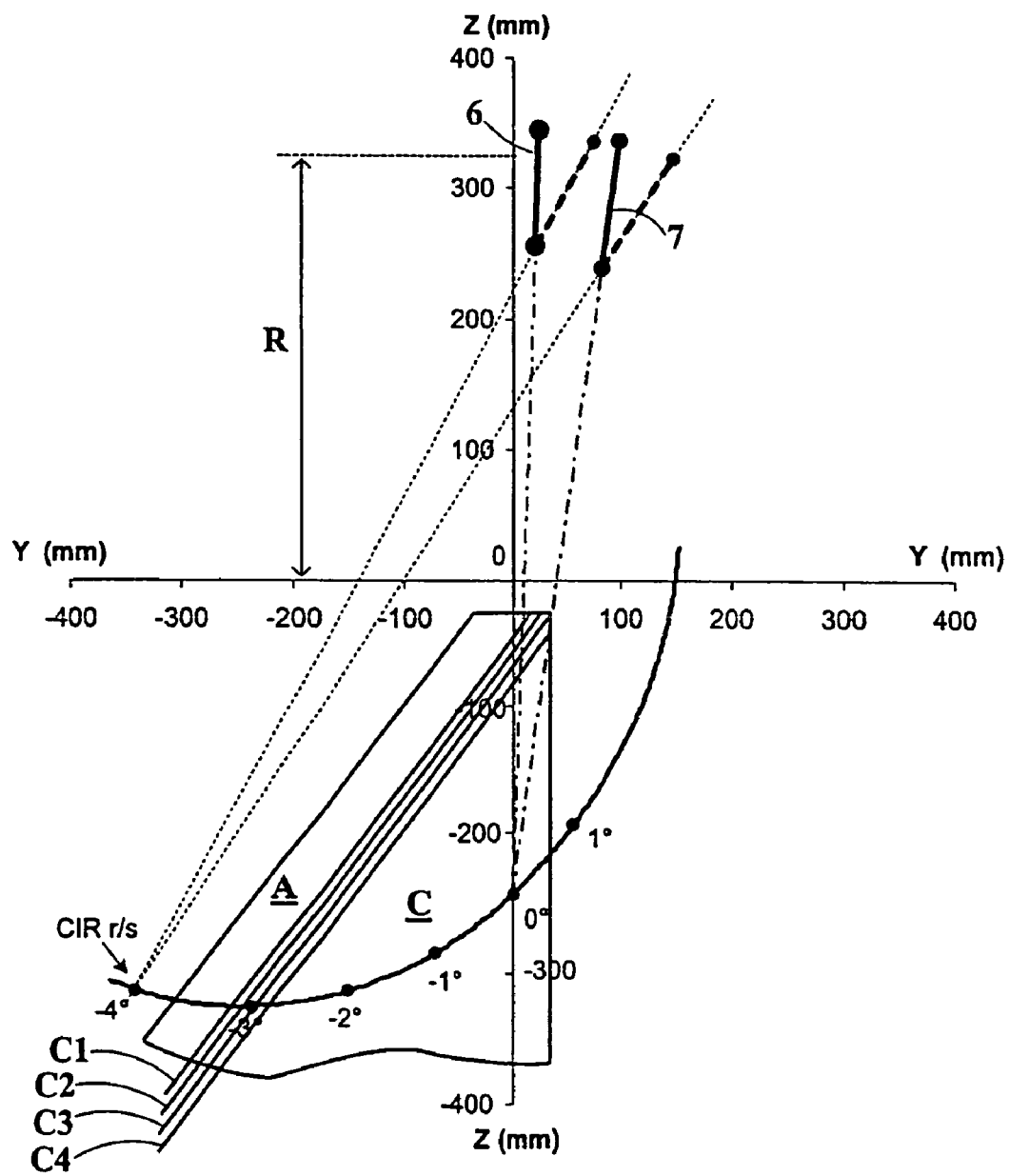

FIG. 4 shows another configuration of the support device of the invention based on rods 6 and 7 which are shorter (about 100 mm), and an instantaneous centre of rotation located, for zero camber, a larger distance below ground level S (about 250 mm). This particular configuration gives a greater variation of the position of the instantaneous centre of rotation. Moreover, the said variation is very asymmetrical relative to the mean position. In effect, the left-hand portion of the evolution curve (i.e. that which corresponds to negative camber) shows that the instantaneous centre of rotation is moving away from ground level when the wheel tilts in the counter-camber direction (at least for a camber angle between 0° and −3°). In contrast, the right-hand portion of the curve (positive camber) shows that the instantaneous centre of rotation rapidly approaches ground level when the wheel tilts in the camber direction. This configuration, which is very different from the previous one, nevertheless satisfies the criterion represented by a sector A identical to the sector A of FIG. 3.

Also schematically shown are the limits C1, C2, C3 and C4 of the sectors C corresponding to the instantaneous centre of rotation position criteria for respective counter-camber angles of −1°, −2°, −3° and −4°. The configuration represented satisfies the criterion corresponding to the limit C1 since the position of the instantaneous centre of rotation for a camber of −1° lies within the sector C limited by C1. Similarly, for an angle of −2°, the corresponding position is located in the sector C limited by C2. On the other hand, in this example the positions for cambers of −3°, −4° and all the more so −5° (not shown) are not contained within the corresponding sectors C.

Figure 5:
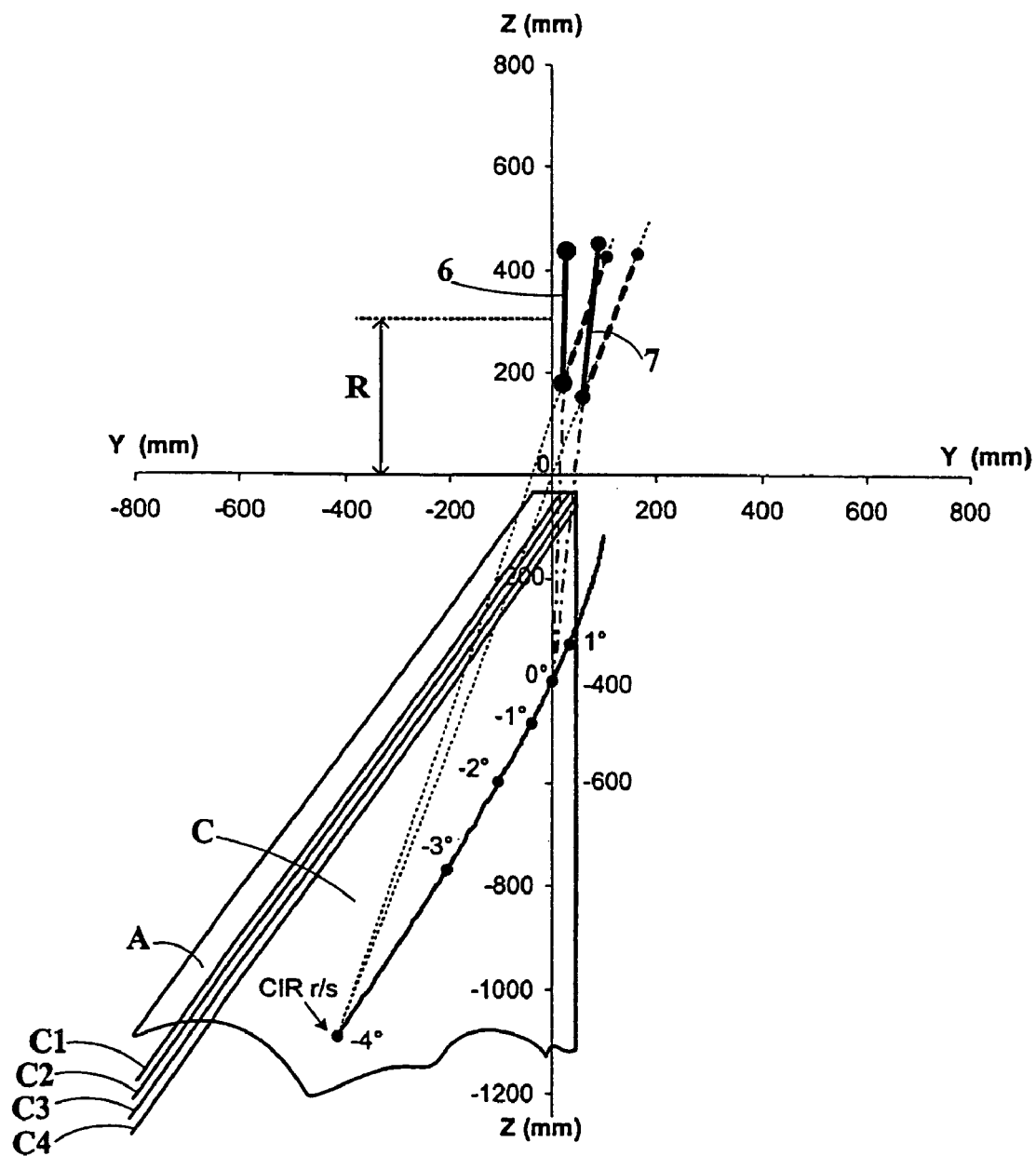

FIG. 5 again represents another configuration of the support device of the invention based on relatively long rods 6 and 7 (respectively about 250 and 300 mm between axes) and an instantaneous centre of rotation, for zero camber, located a still greater distance below ground level S (about 400 mm). This configuration gives a very large and even more asymmetrical variation of the position of the instantaneous centre of rotation (compared with the configuration of FIG. 4). This configuration, which differs from the preceding ones, satisfies the criteria represented by the sector A and those corresponding to the sector C for each of its limits C1, C2, C3, C4. The criterion corresponding to zone B (not shown) is of course also satisfied since in this example, when the camber is zero the instantaneous centre of rotation is located essentially on the vertical axis Z—Z of the scale used.

Figure 6:
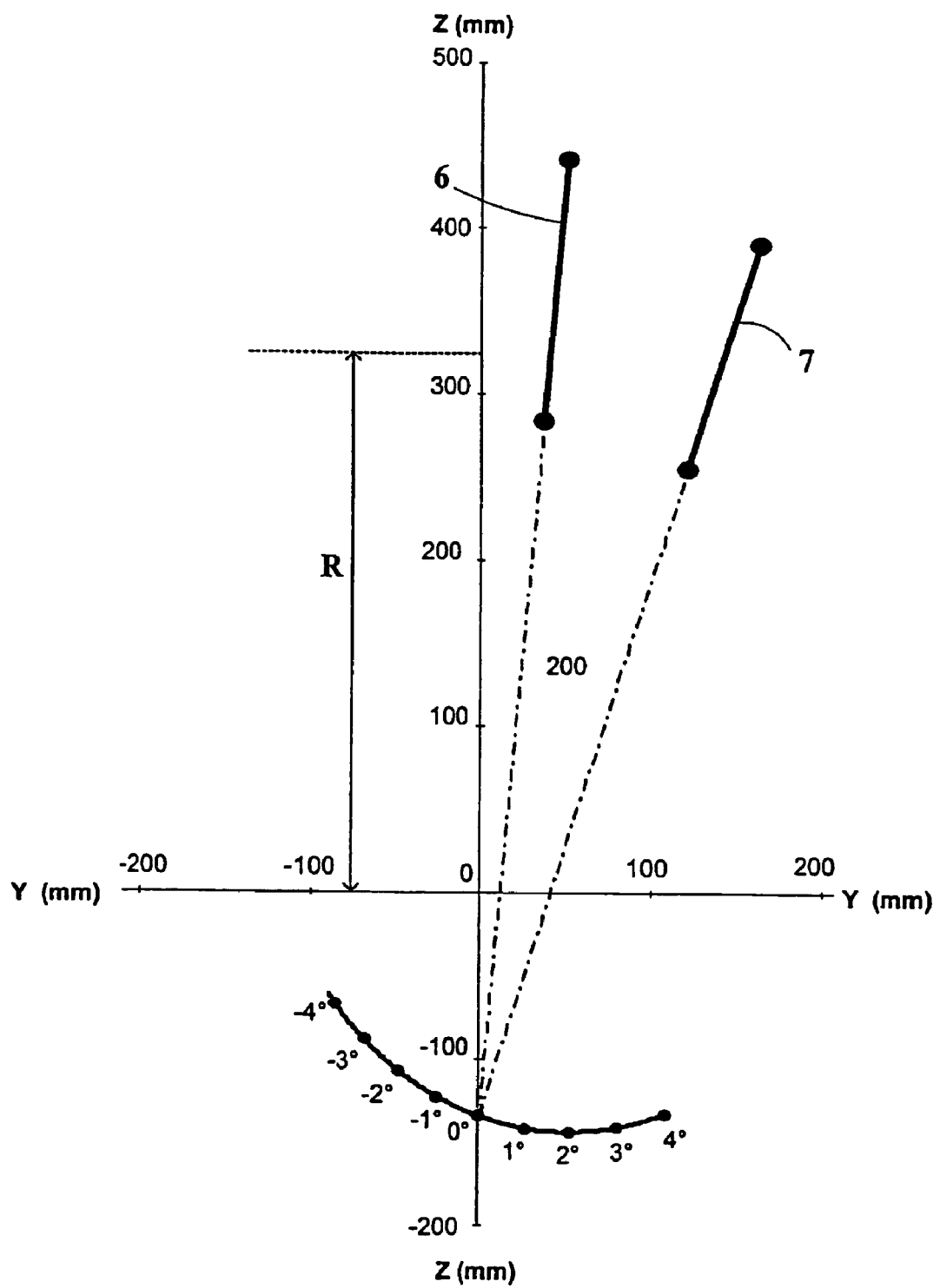

FIG. 6 shows yet another configuration of the support device of the invention, based on rods 6 and 7 whose interaxial distances are respectively about 160 and 140 mm and having an instantaneous centre of rotation at zero camber located about 135 mm below ground level. This configuration gives a larger camber variation for the wheel on the inside of the bend. In effect, since when cornering the inside wheel is subjected to smaller transverse force than the outside wheel, it may be advantageous to have a camber sensitivity in relation to transverse force which is greater for positive than for negative camber angles. This greater sensitivity is obtained by the inclination of the evolution curve around the zero camber position. It is clear from the curve that the depth of the instantaneous centre of rotation relative to the ground for a camber of 1° is greater than for a camber angle of −1°. This preferred tendency is the converse of those of the configurations described by FIGS. 4 and 5. The depth difference is even larger if camber angles of 2° and −2° are compared, and so on up to 4° and −4°.

A point to be noted is that direct comparison of the graphs shown in FIGS. 3, 4, 5 and 6 can be misleading because the representations use different scales. Moreover, the various sectors are shown schematically for the sole purpose of illustrating the characteristics of the invention. Their precise definition emerges from the conditions imposed on the coordinates Y and Z of the instantaneous centre of rotation, as defined in particular in the claims.

FIG. 7 shows an exemplary embodiment of a suspension system according to the invention designed for a racing vehicle. The suspension comprises an upper wishbone 8 articulated by two swivel joints to the body (not shown) and by one swivel joint to the intermediate support 4, and a lower wishbone 9 articulated by two swivel joints to the body and by one swivel joint to the intermediate support 4. The load is taken up by a push-rod 10 and transmitted, in a manner known as such, to a spring (not shown). A track rod (not shown) controls the steering deflection of the intermediate support 4 relative to the body. The wheel carrier 3 is articulated relative to the intermediate support 4 via two rods, an outer rod 6 and an inner rod 7. The rods are connected at one end and the other by swivel joints which define axes or points of articulation. The axes of the rods cross to define the instantaneous centre of rotation (CIR r/s) close to the wheel plane. Preferably, a control means in the form of a camber damper 11 controls the camber variations by controlling the distance between the upper parts of the wheel carrier 3 and the intermediate support 4. A spring can be combined with the damper 11 to influence the camber, for example in order to maintain a static camber different from that which results solely from the configuration, the load carried by the wheel and the rigidity of the tyre.

FIG. 8 shows the V shape of the inner rod 7 which comprises a lower swivel joint for its connection to the intermediate support 4 and two upper swivel joints for its connection to the wheel carrier 3.

FIG. 9 shows the U shape of the outer rod 6 which comprises two lower swivel joints for its connection to the intermediate support 4 and two upper swivel joints for its connection to the wheel carrier 3.

This structure corresponds to a preferred embodiment of the invention when applied to the rear, driving axle of a racing vehicle. In this example, the spin forces are transmitted from the wheel carrier 3 to the intermediate support 4 via the outer rod 6 alone. Alternatively, the inner rod 7 can also be articulated to the intermediate support 4 by a pivot joint (for example by two swivel joints) so that the spin forces will be taken up conjointly by both rods, which can be advantageous from the dimensioning standpoint. On the other hand, since the hyperstatic character of the device increases, its operation will then be more sensitive to the precision of the parallelism between the pivot axes.

Figure 10:
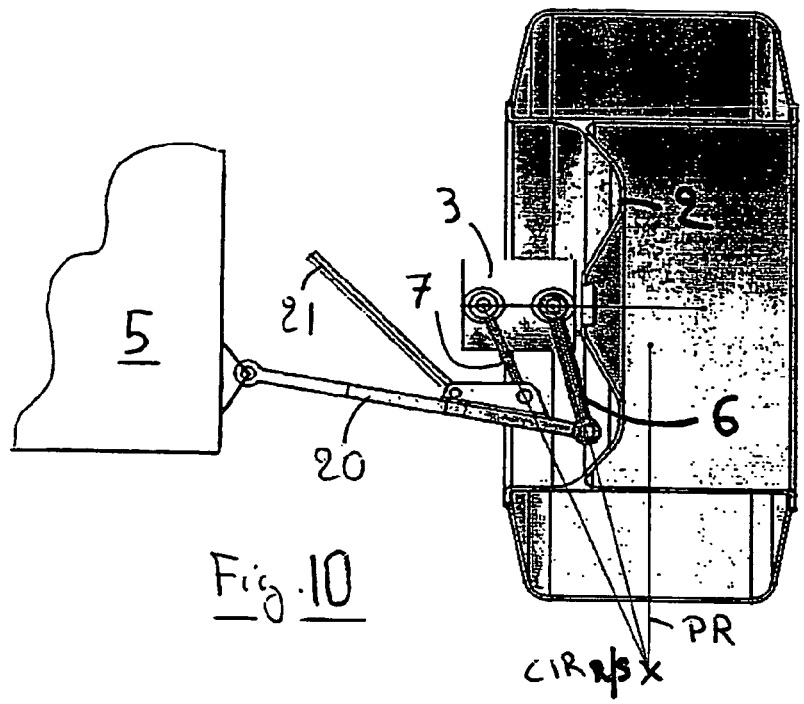
FIGS. 10, 10a and 10b show a suspension system according to the invention, based on the jointed axle principle.
Figure 10A:
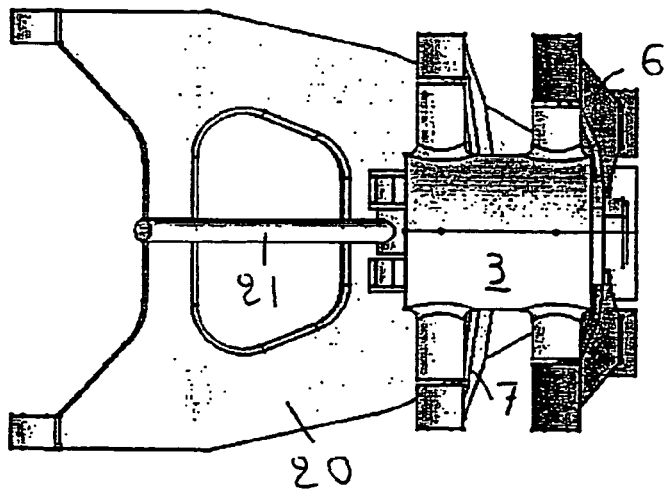
Figure 10B:
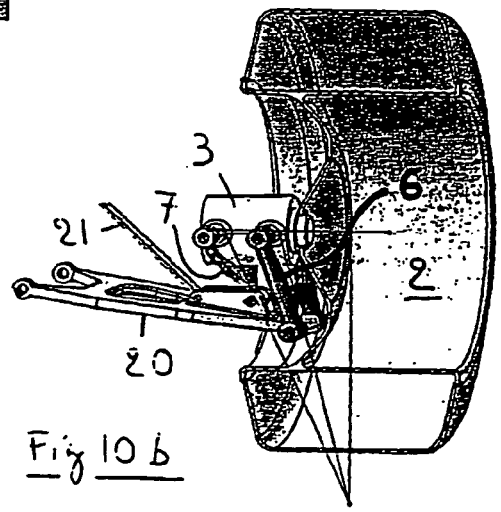

FIGS. 10, 10a and 10b show schematically a suspension system according to the invention which uses the principle (known as such) of a swinging half-axle. The degree of suspension deflection freedom is allowed by oscillation of the wishbone 20 relative to the body 5. A push-rod 21 can be interposed between the triangle 20 and the suspension spring (not shown). The degree of camber freedom of the wheel carrier 3 is allowed by the rods 6 and 7. Thus, the lower wishbone 20 plays the part of the intermediate support 4 (see previous figures) in relation to the wheel carrier 3. It will be understood that in this case the suspension deflection will have an appreciable influence on the configuration of the rods because the inclination of the wishbone varies relative to the body and the ground during the suspension deflection. To the extent that the suspension deflection is small (as is often the case in sports or racing vehicles), this influence remains acceptable.

In this example the outer rod 6 is in the shape of U, H or X, i.e. it has two pivot connections (for example formed by four swivel joints), whereas the inner rod 7 is in the shape of a V, i.e. it has one pivot connection (to the wheel carrier 3) and one point connection (to the wishbone 20). In this example, the spin forces are transmitted from the wheel carrier 3 to the lower wishbone 20 by the outer rod 6. Alternatively, the inner rod 7 can also be articulated to the lower wishbone 20 by a pivot connection (for example by two swivel joints) so that the spin forces are taken up conjointly by both rods, which can be advantageous from the dimensioning standpoint (see earlier).

FIG. 11 shows an interesting variant of the example embodiment of FIGS. 10 to 10b, designed for the driving rear axle of a racing vehicle. The difference is essentially that the spin forces on the wheel carrier 3 are transmitted together by the rods 6 and 7 to the lower wishbone 20 and also by a slider 19 to a triangle 18. This triangle 18 is connected to the body in the manner of a suspension wishbone. The articulated slider 19, orientated transversely to the vehicle, allows for the camber movement by virtue of its degree of freedom in translation associated with a degree of rotational freedom parallel to the camber axis. The articulated slider 19 transmits part of the spin forces on the wheel carrier 3 to the triangle 18 because these forces are directed perpendicularly to the axis of the slider. Thus, the triangle 18 has a function quite different from the upper wishbone 8 of the device in FIG. 7 or of a conventional suspension. Mainly, the triangle 18 allows a reduction of the stresses imposed upon the lower wishbone 20 compared with the stresses imposed in the embodiment of FIGS. 10 to 10b. In this case a sliding joint 19 with ball bearings has been shown, but many alternatives could be used.

A camber damper (not shown) can be used for the same purpose as in FIG. 7. That damper can be combined with the slider 19.

FIG. 12 shows the V shape of the inner rod 7 comprising a lower swivel joint for its connection to the lower wishbone 20 and two upper swivel joints for its connection to the wheel carrier 3. FIG. 13 shows the V or U shape of the outer rod 6 which comprises a lower swivel joint for its connection to the lower wishbone 20 and two upper swivel joints for its connection to the wheel carrier 3. This combination is made possible by the fact that part of the spin forces are taken up by the triangle 18.

Figure 14:
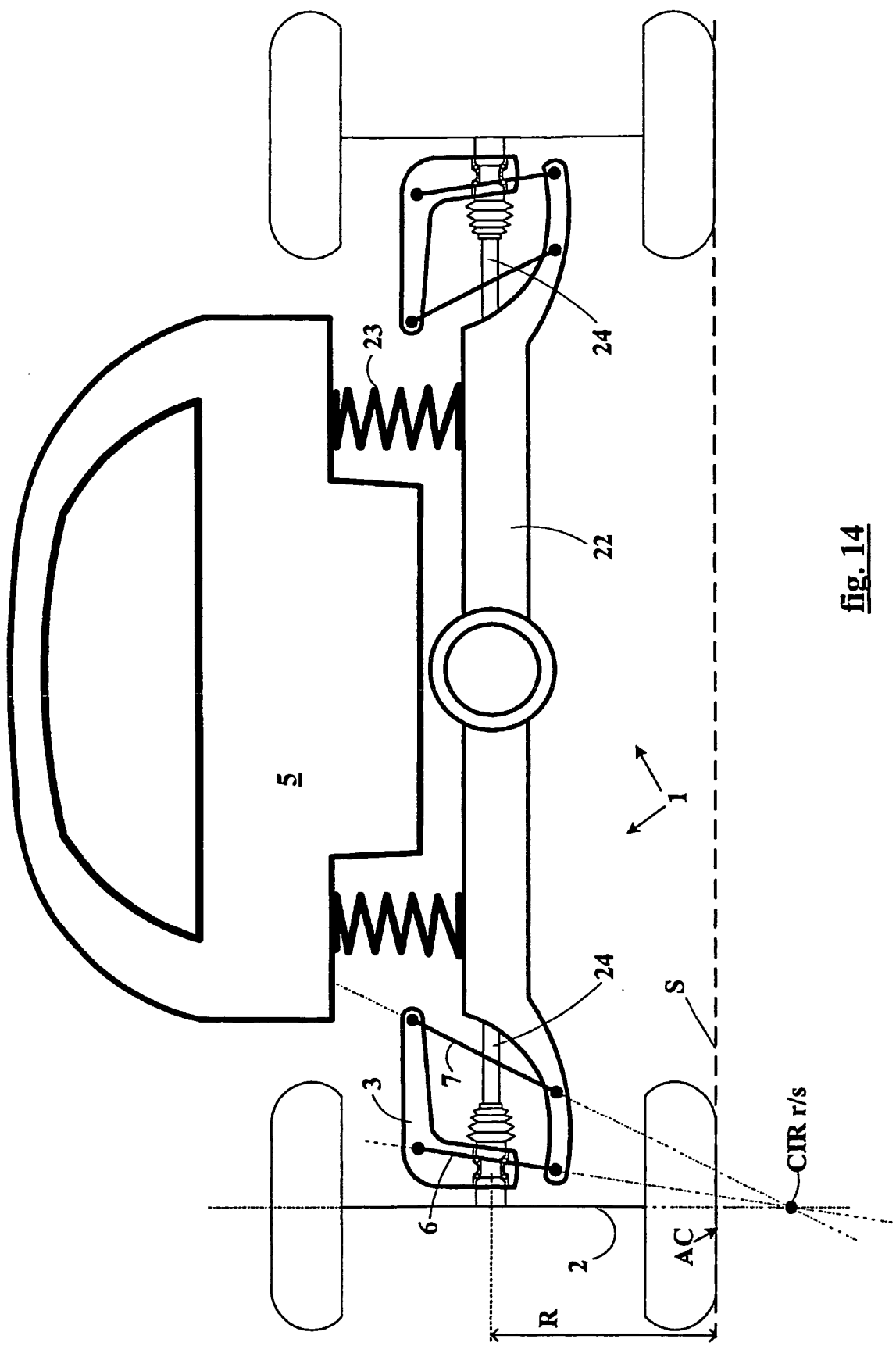
FIG. 14 shows an embodiment of the invention based on the rigid axle principle.

FIG. 14 represents schematically a vehicle according to the invention equipped with a suspension system according to the invention. In this example the rigid axle suspension principle (known as such) is used. The degree of suspension deflection freedom is allowed by the movements of the cross-member 22 relative to the body 5. Springs, shown here in the form of spiral springs 23, carry the load. The degree of camber freedom of the wheel carrier 3 is allowed by the rods 6 and 7. An interesting characteristic of this combination is that the cross-member 22 remains essentially parallel to the ground S so that the inclinations of the wheel carrier 3 relative to the cross-member 22 (which plays the part of the intermediate support 4 in FIG. 2 or 7) correspond essentially to the camber variations of the wheel relative to the ground. The suspension deflection does not influence the configuration of the rods. A drive rigid axle has been shown here (see the transmissions 24). The suspension system of the invention can also be applied, of course, in the case of non-driving rigid axles.

FIGS. 3 to 11 correspond to applications of the invention for a loaded radius R of about 320 mm.

The figures represent particular embodiments of the invention in which the instantaneous centre of rotation is contained essentially within the reference plane PV when the camber of the wheel is zero ($\alpha=0°$), i.e. when the wheel plane PR is vertical. According to the invention, other configurations can be imagined in which the instantaneous centre of rotation, at zero camber, is away from the plane PV. Preferably, the instantaneous centre of rotation remains contained within the zone B aimed at. Under rated load the wheel will then tend to adopt a non-zero static camber unless corrective measures are taken, for example in the form of one or more springs. Another example of a corrective measure can be a link (for example mechanical or hydraulic) between the two wheel carriers of the same axle so as to make the camber movements of the two wheels interdependent. A supplementary effect of such a link is that it can make the camber movements dependent not only at rest and in a straight line, but also when cornering.

An interesting feature of the invention is that it is applicable to all the known suspension designs, since supplementary elements can be added to these existing systems which allow a degree of camber freedom over and above the existing degree of freedom of the suspension. For example, the invention can of course be applied on the basis of MacPherson suspension systems or derivatives as described in the application WO 01/72572 (corresponding to U.S. Pat. No. 6,688,620) and in particular FIGS. 2 and 3 of that document. In this case the lower portion of the strut constitutes the intermediate support to which the wheel carrier is articulated.

The joints of the various elements of the support device or suspension system can be made in various ways. The elastomeric joints currently used in the ground contact area can simplify the achievement of system equilibrium because they introduce given stiffness. On the other hand they are also known to favour the comfort of the vehicle. In the context of racing vehicles the use of ball joints is preferred for reasons of guiding precision, weight or bulk. An interesting alternative, known as such in the context of racing vehicles, consists in the use of flexible composite blades.

To check that a support device or suspension system satisfies a given criterion concerning the variation of the position of its instantaneous centre of rotation, the following method can be used:

1—The geometry of the system is determined when the suspension is carrying its rated static load, i.e. the position in the camber plane of the articulation points of the rods, that of the wheel plane PR and that of ground level S are determined and the loaded radius R (for zero camber angle and a tyre at its normal working pressure) is measured.

2—The evolution curve of the instantaneous centre of rotation in the camber plane is constructed (see the examples of FIGS. 3 to 6). This can be done for example in a theoretical way from the configuration determined in stage 1. It can also be done experimentally by artificially imposing the camber variation on the wheel carrier so as to go through the camber deflection aimed at (for example, from 0° to −3°) and at the same time noting the positions of the rods, so that the corresponding positions of the instantaneous centre of rotation can then be deduced from them. To apply the experimental method, the intermediate support (or the lower triangle, as the case may be) must be kept immobile relative to the ground S and to the reference plane PV, for example by fixing it on a measurement bench. The wheel or tyre is then advantageously taken off. The experimental method may be limited by the presence of stops or other design constraints. In that case the theoretical method must be used, at least for the inaccessible part of the deflection concerned.

3—The evolution so defined is compared graphically or numerically with the criteria (sectors A and C and zone B) determined as a function of the radius R found.

The various geometrical configurations described and illustrated in particular in FIGS. 3 to 6 are of course applicable in accordance with the invention to the various possible embodiments, in particular those illustrated in FIGS. 7 to 14.

The invention claimed is:

1. Support device connecting a wheel to suspension elements of a vehicle, said wheel having a radius 'R' being and designed to rest on the ground, said support device comprising rods articulated at respective lower ends thereof to the suspension elements and at respective upper ends thereof to a wheel carrier to confer on said wheel a degree of camber freedom relative to said suspension elements, the camber movement taking place around an instantaneous centre of rotation, the instantaneous position of which defined by horizontal and vertical coordinates Y and Z in a camber plane, said instantaneous position, during a camber deflection from 0° to −1°, simultaneously satisfying the following conditions measured from where the wheel center vertical center contacts the ground:

$Y \leq 0.125*R$ $Z \leq -0.0625*R$ $Z \leq 0.66225*Y + 0.02028*R$.

2. Device according to claim 1, configured such that said conditions are also satisfied during a camber deflection from 0° to −2°.

3. Device according to claim 1, configured such that said conditions are also satisfied during a camber deflection from 0° to −3°.

4. Device according to claim 1, configured such that said conditions are also satisfied during a camber deflection from 0° to −4°.

5. Support device according to claim 1, configured such that the position of said instantaneous centre of rotation, at zero camber, also satisfies the following conditions:

$-0.125*R \leq Y \leq 0.125*R$ $Z \leq -0.0625*R$.

6. Support device according to claim 5, in which the position of said instantaneous centre of rotation, at zero camber, also satisfies the following condition:

$-0.0625*R \leq Y \leq 0.0625*R$.

7. Support device according to claim 1, in which the position of said instantaneous centre of rotation, at a camber of −1°, also satisfies the following condition:

$Z \leq 0.66225*Y - 0.15*R$.

8. Support device according to claim 1, in which the position of said instantaneous centre of rotation, at a camber of −2°, also satisfies the following condition:

$Z \leq 0.66225*Y - 0.1625*R$.

9. Support device according to claim 1, in which the position of said instantaneous centre of rotation, at a camber of −3°, also satisfies the following condition:

$Z \leq 0.66225*Y - 0.1719*R$.

10. Support device according to claim 1, in which the position of said instantaneous centre of rotation, at a camber of −4°, also satisfies the following condition:

$Z \leq 0.66225*Y - 0.1844*R$.

11. Support device according to claim 1, in which the position of said instantaneous centre of rotation, at a camber of −5°, also satisfies the following condition:

$Z \leq 0.66225*Y - 0.1969*R$.

12. Support device according to claim 1, configured such that the position of said instantaneous centre of rotation, at zero camber, also satisfies the following condition:

$Z \geq -0.9375*R$.

13. Support device according to claim 1, configured such that a vertical distance between around level and the instantaneous centre of rotation at a camber of 1° is greater than at a camber of −0°.

14. Support device according to claim 1, designed to be connected to a MacPherson strut.

15. Support device according to claim 1, further comprising control means for influencing the camber of the wheel.

16. Support device according to claim 15, in which the control means comprise a damper.

17. Support device according to claims 15 or 16, in which the control means comprise a spring.

18. Support device according to claim 1, in which the an axially innermost one of the rods is connected on the one hand to the wheel carrier by a pivot joint and on the other hand to the suspension elements by a swivel joint.

19. Suspension system (1) for a vehicle, comprising the support device according to claim 1.

20. Suspension system (1) according to claim 19, also comprising a rigid axle.

21. Vehicle comprising a suspension system (1) according to claim 19.

* * * * *

UNITED STATES PATENT AND TRADEMARK OFFICE
CERTIFICATE OF CORRECTION

PATENT NO. : 7,152,867 B2
APPLICATION NO. : 11/149554
DATED : December 26, 2006
INVENTOR(S) : Vincent Lemineur et al.

It is certified that error appears in the above-identified patent and that said Letters Patent is hereby corrected as shown below:

Col. 11, line 62
Claim 1, line 14, change "vertical center" (second occurrence) to -- vertical plane --

Signed and Sealed this

Eighteenth Day of March, 2008

JON W. DUDAS
*Director of the United States Patent and Trademark Office*